United States Patent
Yoon

(10) Patent No.: US 9,483,974 B2
(45) Date of Patent: Nov. 1, 2016

(54) METHOD AND APPARATUS FOR DISPLAYING KEYPAD USING ORGANIC LIGHT EMITTING DIODES

(71) Applicant: Samsung Electronics Co. Ltd., Suwon-si, Gyeonggi-do (KR)

(72) Inventor: Geonho Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 13/857,745

(22) Filed: Apr. 5, 2013

(65) Prior Publication Data

US 2013/0271405 A1 Oct. 17, 2013

(30) Foreign Application Priority Data

Apr. 13, 2012 (KR) ........................ 10-2012-0038243

(51) Int. Cl.
| | |
|---|---|
| G09G 3/30 | (2006.01) |
| G09G 3/32 | (2016.01) |
| G06F 3/041 | (2006.01) |
| G06F 3/0489 | (2013.01) |
| G06F 3/023 | (2006.01) |

(52) U.S. Cl.
CPC ........... *G09G 3/3208* (2013.01); *G06F 3/0238* (2013.01); *G06F 3/041* (2013.01); *G06F 3/04895* (2013.01); *G06F 3/04897* (2013.01)

(58) Field of Classification Search
CPC .............. G06F 3/0238; G06F 1/1662; G06F 15/0225; G06F 2203/04809; G06F 3/041; G09G 3/3208
USPC ......................................... 345/168, 170–172
See application file for complete search history.

(56) References Cited

U.S. PATENT DOCUMENTS

| | | | |
|---|---|---|---|
| 7,271,360 B2 * | 9/2007 | Kobayashi | 200/314 |
| 8,321,810 B2 * | 11/2012 | Heintze | G06F 3/0202 345/172 |
| 8,890,719 B2 * | 11/2014 | Salman et al. | 341/22 |
| 2005/0073446 A1 * | 4/2005 | Lazaridis | G06F 3/0202 341/22 |
| 2007/0083827 A1 * | 4/2007 | Scott et al. | 715/811 |
| 2007/0094616 A1 * | 4/2007 | Won et al. | 715/847 |
| 2010/0205559 A1 * | 8/2010 | Rose | 715/781 |
| 2010/0281410 A1 * | 11/2010 | Heintze | G06F 3/0202 715/769 |
| 2010/0302192 A1 * | 12/2010 | Park | G06F 3/041 345/173 |
| 2011/0080345 A1 * | 4/2011 | Jun et al. | 345/169 |

* cited by examiner

*Primary Examiner* — Quan-Zhen Wang
*Assistant Examiner* — Xuemei Zheng
(74) *Attorney, Agent, or Firm* — Jefferson IP Law, LLP

(57) ABSTRACT

A method and an apparatus for displaying a keypad on a touch screen are provided. The apparatus includes an Organic Light Emitting Diode (OLED). The method includes arranging at least one keypad block including at least one area, determining at least one light-emitting area among the areas, and displaying the at least one keypad block by emitting light in the OLED corresponding to the at least one light-emitting area.

14 Claims, 11 Drawing Sheets

METHOD AND APPARATUS FOR DISPLAYING KEYPAD USING ORGANIC LIGHT EMITTING DIODES

PRIORITY

This application claims the benefit under 35 U.S.C. §119(a) of a Korean patent application filed on Apr. 13, 2012 in the Korean Intellectual Property Office and assigned Serial No. 10-2012-0038243, the entire disclosure of which is hereby incorporated by reference.

BACKGROUND OF THE INVENTION

1. Field of the Invention

The present invention relates to a method and an apparatus for displaying a keypad using Organic Light Emitting Diodes (OLEDs). More specifically, the present invention relates to a method and an apparatus for displaying a keypad using OLEDs capable of displaying a keypad by controlling light-emission of the OLEDs according to selection of an input mode.

2. Description of the Related Art

A Liquid Crystal Display (LCD) has been used for displaying a keypad. In this case, the keypad is displayed in such a manner that an entire screen is back-lit and a white light illuminated from the LCD passes through a color filter. In such a case, there is a problem in that power is uniformly consumed regardless of an area displayed on the screen. Furthermore, such a user interface for displaying the keypad does not include an icon for executing an application thereof. That is, the icon is displayed on a separate screen rather than the keypad display screen. Therefore, a user may confirm the icon only when deviating from the keypad display screen.

As such, a need exists for a method and apparatus for displaying a keypad using OLEDs capable of reducing power consumption by providing an interface for displaying a keypad which emits light only to an area that needs to be recognized by a user.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or provide at least the advantages described below. Accordingly, an aspect of the present invention is to provide a method and an apparatus for displaying a keypad using Organic Light Emitting Diodes (OLEDs) capable of reducing power consumption by providing an interface for displaying a keypad which emits light only to an area that needs to be recognized by a user.

Another aspect of the present invention is to provide an interface capable of enabling a user to easily execute an application thereof by displaying an icon on a keypad block.

In accordance with an aspect of the present invention, a method for displaying a keypad on a touch screen including an OLED is provided. The method includes arranging at least one keypad block including at least one area, determining at least one light-emitting area among the at least one area, and displaying the at least one keypad block by emitting light in the OLED corresponding to the light-emitting area.

In accordance with another aspect of the present invention, an apparatus for displaying a keypad on a touch screen is provided. The apparatus includes a touch screen including an OLED, and a control unit for configuring at least one keypad block including at least one area, for determining at least one light-emitting area among the areas, and for displaying the keypad block by emitting the light in the OLED corresponding to the light-emitting area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "terminal" in this document denotes an information process apparatus capable of processing data transmitted and received from the outside. In addition, the terminal may display the stored data or icons in which the various functions executed in the terminal are mapped, respectively. Here, the terminal include a computer, a laptop computer, a tablet Personal Computer (PC), a portable terminal, and the like, but is not limited thereto.

Furthermore, the term "icon" in this document denotes a picture or a sign displayed on a screen of the terminal in order to recognize or execute an application, a folder, data or the like. In this case, the icon may be displayed in an arbitrary shape, form, color or a combination thereof.

In addition, the term "character area" in this document indicates an area for displaying English characters, Korean alphabets, Chinese characters, Japanese characters, numbers, special characters, or the like on a keypad block configuring the keypad. That is, the character area means to include the numbers or the special characters and various characters while not being limited to the Korean alphabets, the English characters, and the like as described above.

Figure 1:
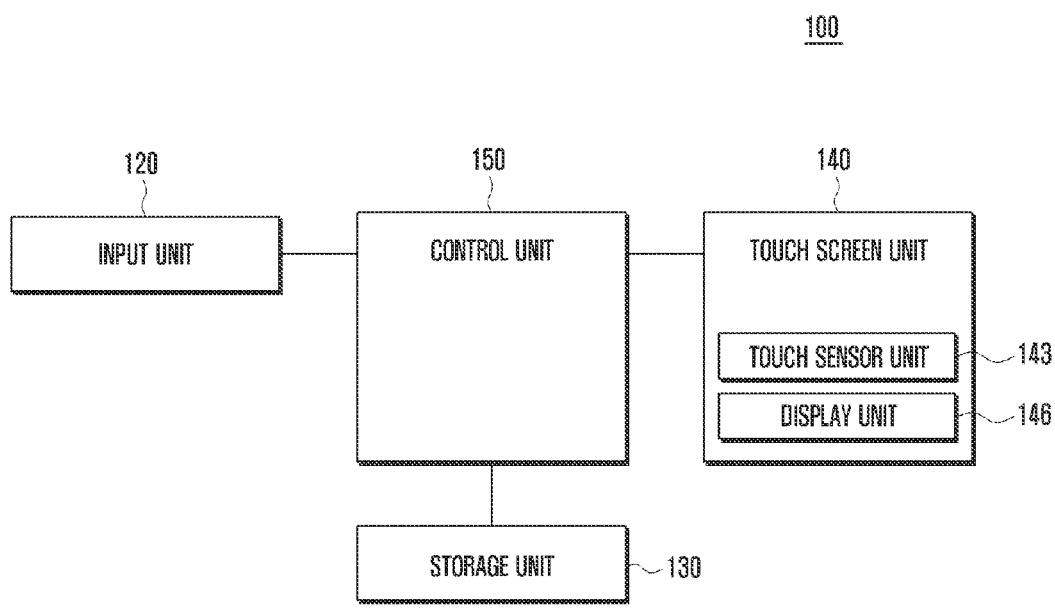
FIG. 1 is a block diagram illustrating an internal structure of an apparatus for displaying a keypad according to an exemplary embodiment of the present invention.

FIG. 1 is a block diagram illustrating an internal structure of an apparatus for displaying a keypad according to an exemplary embodiment of the present invention.

Referring to FIG. 1, the terminal 100 may include an input unit 120, a storage unit 130, a touch screen unit 140, and a control unit 150.

The input unit 120 receives a user input for controlling the terminal 100 and generates an input signal to transfer the generated input signal to the control unit 150. The input unit 120 may be configured of a key pad including a numeral key and a direction key, and may be formed with a certain function key provided on one side of the terminal 100. In an exemplary embodiment of the present invention, the terminal 100 may be controlled by only the touch screen unit 140. In this case, a touch sensor unit 143 may execute the function of the input unit 120.

The storage unit 130 serves to store a program and data for operating the terminal 100, and may be divided into a program area and a data area.

The program area may include a program for controlling operations of the terminal 100, an Operating System (OS) for booting the portable terminal 100, an application program required for multimedia content play, and an application program required for other functions of the portable terminal 100, for example, a camera function, a sound play function, an image, a video play function, and the like. The data area, which stores data generated according to the use of the terminal 100, may store an image, a video, a phone book, audio data, and the like.

The touch screen unit 140 includes the touch sensor unit 143 and a display unit 146.

The touch sensor unit 143 senses the touch input of the user. The touch sensor unit 143 may be configured of a touch sensor such as a capacitive overlay, a resistive overlay, an infrared beam, a pressure sensor, and the like. The touch sensor unit 143 may be configured of any type of sensor device capable of sensing the contact or pressure of an object in addition to the sensors. The touch sensor unit 143 senses the touch input of the user and generates the sensing signal to transmit to the control unit 160. The touch sensor unit 143 also includes coordinate data inputted by the user touch in the sensing signal. When the user inputs the operation for moving the touch position, the touch sensor unit 143 generates the sensing signal including the coordinate data on a movement path of the touch position to transmit the sensing signal to the control unit 160. More particularly, the touch sensor unit 143 may sense the user input in order to select an input mode, release a power-saving mode, configure the keypad, arrange an icon, and the like.

The display unit 146 may be formed of a Liquid Crystal Display (LCD), Organic Light Emitting Diodes (OLEDs), Active Matrix Organic Light Emitting Diodes (AMOLEDs), and the like, and visually provides the menu of the terminal 100, the input data, function setting information, and other information to the user.

In an exemplary embodiment of the present invention, the display unit 146 is formed of one or more OLEDs and displays the keypad.

Here, the OLEDs indicate a self, light-emitting organic material that emits light on its own using an electro-luminescence phenomenon when a current flows to a fluorescent organic compound. The OLED, which is distinct from an LCD that serves to open or close a pixel, uses the organic material emitting the light by itself without a backlight whereby the OLED may adjust the light emitting in a pixel unit.

Therefore, an exemplary display unit of the present invention displays the keypad supplying power only to the OLED corresponding to a light-emitting area, thereby making it possible to reduce power consumption.

Although exemplary embodiments of the present specification have been described wherein the display unit 146 is formed of OLEDs, the present specification is not limited thereto. More particularly, the present method and the apparatus for displaying a keypad including an icon may be applied to a display unit 146 formed of an LCD in addition to the display unit 146 formed of OLEDs.

The control unit 150 controls operations of the terminal 100 and may control each component of the terminal 100. More particularly, in the terminal 100, the control unit 150 may control a series of processes in which the keypad block is configured, the light-emitting area is determined in the keypad block, and the OLEDs corresponding to the light-emitting area emit light to display the keypad.

The control unit 150 may configure the keypad block by dividing it into an edge area, and at least one of a character area, a numeric area, and an icon area. For example, in the case in which a single keypad block is displayed as a square, the outside of the square may be set to the edge area so that the keypad blocks may be distinguished from each other. In addition, the keypad block may be configured in such a manner that a left upper end in the square is an English alphabet area, a right upper end and a right lower end therein is a Korean alphabet area, and a left lower end therein is an icon area.

The control unit 150 receives user input selecting the input mode to determine the light-emitting area. In the example described above, in the case in which the user selects the English character input mode, the control unit 150 may determine the edge area and only the English character area of the upper left side among the keypad blocks as the light-emitting area.

Furthermore, the control unit 150 controls to emit light only by the OLEDs corresponding to the light-emitting area and to display the keypad block on the screen. As an example, the control unit 150 supplies power so that the light is emitted only by the OLEDs corresponding to the edge area and the English character area. In this case, the user may recognize only an outline of the keypad block and the English character area, and may recognize all remaining areas as black. An exemplary user interface for displaying the keypad by dividing the light-emitting area will be described below with reference to the accompanying drawing.

Meanwhile, the control unit 150 may arrange the icons on the keypad block in various schemes.

First, the control unit 150 may arrange the icons on the keypad block in terms of an icon generating time sequence. That is, the icons may be sequentially arranged on the keypad block in order as to a quick or a slow generating time.

Second, the control unit 150 may arrange the icons on the keypad block by an execution frequency of the icon. That is, the icons may be sequentially arranged on the keypad block in terms of how frequently they are executed.

Third, the control unit 150 may arrange the icons on the keypad block according to a name of the program corresponding to the icon or the folder. For example, in the case in which the name of the application is "KAKAO TOK", a corresponding icon may be positioned at the keypad block including the Korean alphabet "K". As another example, in the case in which the name of the program is "Out-Look", a corresponding icon may be positioned at the keypad block including the English character "O". In addition, in the case in which the name of the folder is "Finance", a corresponding icon may be positioned at the keypad block including the Korean alphabet "F".

Fourth, the control unit 150 may arrange the icons on the keypad block according to setting of a user.

A dual display terminal configured of a first display portion for displaying the keypad and a second display portion for displaying other screens is exemplified. Here, in the case in which the control unit 150 generates an icon, the icon may be displayed at the second display portion.

In this case, the user may want to include the icon in a specific keypad block of the first display portion. At this time, the control unit 150 may set a touch input on the specific icon of the second display portion and a drag input into the specific keypad block of the first display portion after the touch input as an icon arrangement command. In addition, in the case in which the control unit 150 receives the icon arrangement command, the specific icon may be positioned at the specific keypad block. An exemplary user interface for arranging the icon according to the setting of a user will be described with reference to the accompanying drawing.

In order to understand the technology, FIG. 3 will be described prior to FIG. 2.

Figure 3:
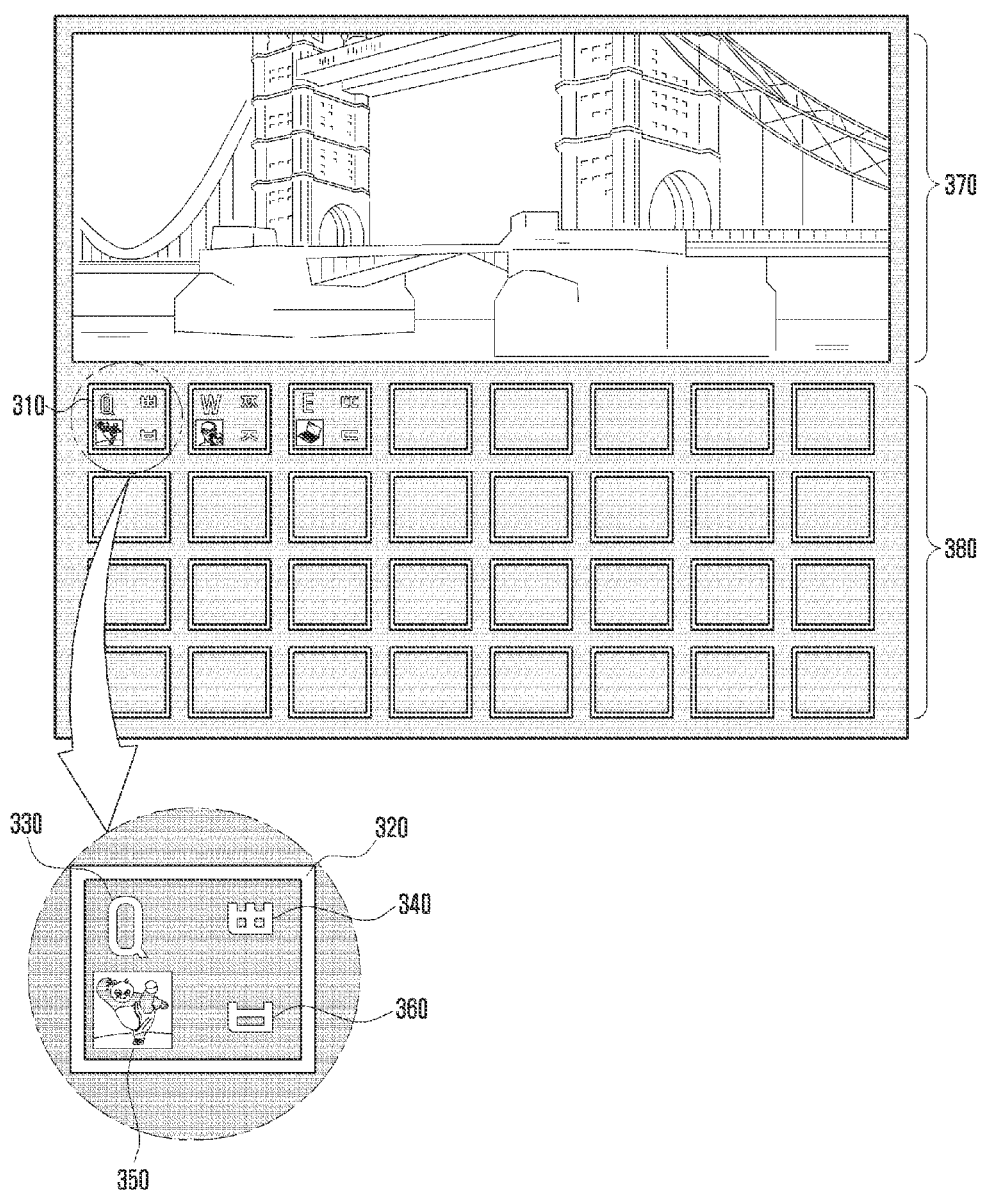
FIG. 3 is diagram illustrating an interface for displaying a keypad in a terminal including a dual display according to an exemplary embodiment of the present invention.

FIG. 3 is diagram illustrating an interface for displaying a keypad in a terminal including a dual display according to an exemplary embodiment of the present invention.

Referring to FIG. 3, a dual display terminal, configured of a first display portion 380 for displaying a keypad and a second display portion 370 for displaying other screens, is illustrated. Although FIG. 3 illustrates a configuration in which the first display portion 380 and the second display portion 370 are separated from each other, the present invention is not so limited. That is, even in the case of a terminal capable of dividing one display portion into a plurality of areas, the same description may be applied. Here, a single block 310 configuring the keypad may be divided into five areas 320, 330, 340, 350, and 360 as shown in FIG. 3.

The area 320 is the edge area for the outline of the keypad block. The area 320 serves to distinguish the keypad blocks from each other. The area 330 displays the English character and the areas 340 and 360 display the Korean alphabet. The area 350 is the icon area capable of displaying the icon. That is, an exemplary implementation of the present invention displays the keypad block including the icon area 350 unlike the conventional keypad configuration.

Although not shown in FIG. 3, in the case of the keypad block for displaying the number or the special character such as '%', the area 330 may display the special character, the area 360 may display the number, the area 350 may display the icon, and the area 320 may be empty.

Figure 4:
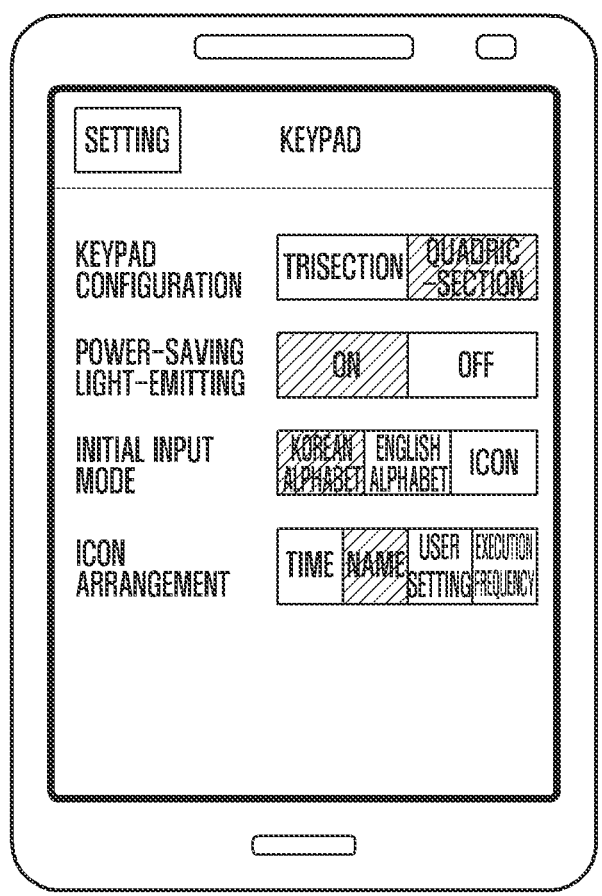
FIG. 4 is diagram illustrating a menu screen through which a user may set an interface for displaying a keypad according to an exemplary embodiment of the present invention.

FIG. 4 is diagram illustrating a menu screen through which a user may set an interface for displaying a keypad according to an exemplary embodiment of the present invention.

Referring to FIG. 4, in the case in which the user selects the keypad setting menu among the entire menu of the terminal 100, the user may select the keypad configuration, the power-save light emitting, an initial input mode, and the icon arrangement scheme.

In the case of the menu for setting the keypad configuration, when the user selects a trisection, the control unit 150 may configure the keypad block without the icon area. On the other hand, when the user selects a quadric-section, the control unit 150 configures the keypad block including the icon area as described above.

In the case of a power saving light-emitting setting menu, when the user selects 'OFF', the control unit 150 controls to emit light in the entire area configuring the keypad block. On the other hand, when the user selects 'ON', the control unit 150 determines the light-emitting area of the keypad block and controls to emit light only in the OLED or OLEDs corresponding to the light-emitting area.

In the case of the menu for the setting the initial input mode, if the user selects the Korean alphabet, the control unit 150 displays the keypad to emit the light only in the edge area 320 and in the Korean alphabet areas 340 and 360 of the keypad block. After this, the user may select the input mode using the keypad of the display portion rather than the keypad setting menu of FIG. 4, and the control unit 150 may change the light-emitting area according to the input mode selection of the user.

In the case of the menu for setting the icon arrangement, when the user selects the icon name, the control unit 150 may arrange the icons on the keypad block according to a name of the program corresponding to the icon or the folder. For example, when the control unit 150 generates an icon '하생중', the control unit 150 may display the generated icon in the icon block including 'ㅎ'.

Figure 2:
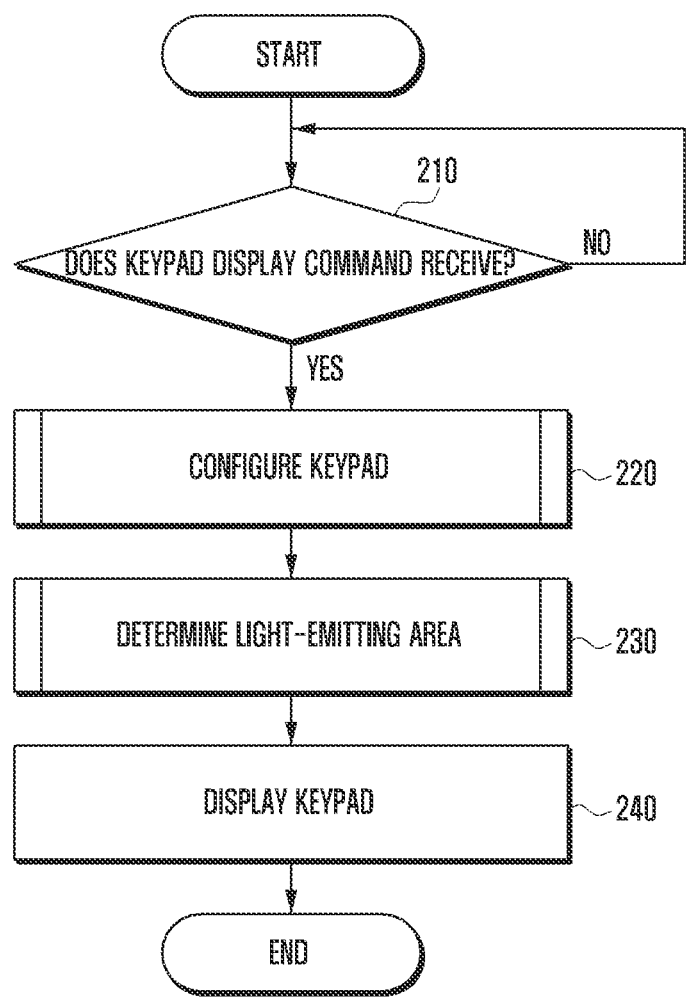
FIG. 2 is a flowchart illustrating a process for displaying a keypad so as to divide a light-emitting area according to an exemplary embodiment of the present invention.

FIG. 2 is a flowchart illustrating a process for displaying a keypad by dividing a light-emitting area according to an exemplary embodiment of the present invention.

Referring to FIG. 2, the control unit 150 determines if a keypad display command is received at step 210.

For example, in the case of the terminal in which a first display portion for displaying a keypad and a second display portion for displaying other screens are separated in a folder form, the control unit 150 may set the keypad display command to operate as a result of the folder opening. Meanwhile, in the case of the general terminal in which the display units are not separated from each other, the control unit 150 may set the keypad display command according to a conventional method.

The control unit 150 configures the keypad at step 220. Here, the control unit 150 may permit the keypad to include a plurality of blocks, wherein the block includes an edge area and at least one of a character area, a number area, and an icon area.

Figure 5:
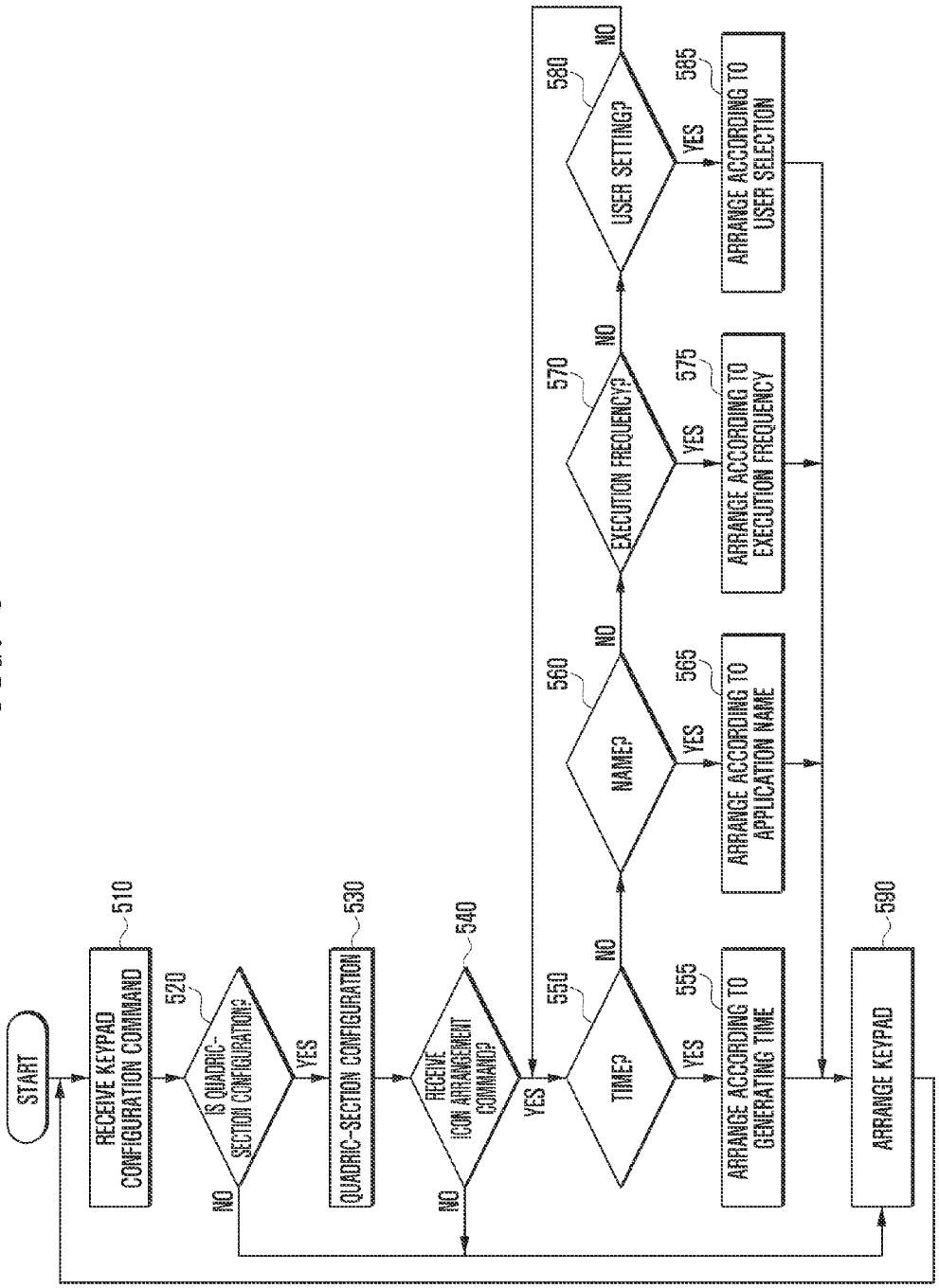
FIG. 5 is a flowchart illustrating a process for configuring a keypad according to an exemplary embodiment of the present invention.

FIG. 5 is a flowchart illustrating a process for configuring a keypad according to an exemplary embodiment of the present invention.

Referring to FIG. 5, the control unit 150 may control to receive a keypad configuration command at step 510. The keypad configuration command indicates a user input which sets the configuration of the keypad block by including the edge area of the keypad, and at least one of a character area and an icon area.

The control unit 150 determines whether the keypad configuration command is a quadric-section at step 520. The quadric-section indicates a configuration in which the inside of the keypad block is divided into four areas and includes the icon area unlike the conventional keypad configuration. That is, the quadric-section command indicates a user input for configuring the keypad block by including the icon area. In an exemplary implementation, the icon area is positioned at a lower left side of a square inside.

When the quadric-section command is received, the control unit 150 configures the keypad block into the quadric-section at step 530. For example, the control unit 150 may configure the keypad block in such a manner that a left upper end in the square is an English alphabet area, a right upper end and a right lower end therein is a Korean alphabet area, and a left lower end therein is an icon area.

In addition, the keypad block for displaying the number or the special character such as '%' may be configured in such a manner that a left upper end in the square is an special character area, a right lower end therein is a number area, and a left lower end therein is an icon area, while a left upper end may be empty.

In step 540, the control unit 150 determines if the icon arrangement command is received. The icon arrangement command indicates a user input for arranging the icons in the keypad block according to an icon arrangement rule. In an exemplary implementation, the control unit 150 may arrange the icons in the keypad block in various schemes.

When it is determined that the icon arrangement command is received and is a command to arrange the icons in a time sequence at step 550, the control unit 150 may arrange the icons in the keypad block according to an icon generation time at step 555. For example, the icons may be sequentially arranged on the keypad block in order of a quick or a slow generating time.

When the user input is to arrange the icons according to an icon name at step 560, the control unit 150 may arrange the icons in the keypad block according to a name of the program corresponding to the icon or the folder at step 565. For example, in the case in which the name of the application is "카카오북", a corresponding icon may be positioned at the keypad block including the Korean alphabet "ㅋ". As another example, in the case in which the name of the program is Out Look, a corresponding icon may be positioned at the keypad block including the English character "O". In addition, in the case in which the name of the folder is "규용", a corresponding icon may be positioned at the keypad block including the Korean alphabet "ㄱ".

When the user input is to arrange the icons according to an execution frequency at step 570, the control unit 150 may arrange the icons in the keypad block according to an icon execution frequency at step 575. For example, the icons may be sequentially arranged in the keypad block according to the total number of times they are used, the number of times they are used over a certain period of time, and the like.

When the user input is an icon arrangement command for arranging the icons according to a separate setting at step 580, the control unit 150 may arrange the icons in the keypad block according to designation of a user at step 585.

Thereafter, the control unit 150 configures the keypad block by including the arranged icons at step 590.

An example of step 565 of an interface for arranging icons according to the separate designation of the user is provided below.

Figure 6A:
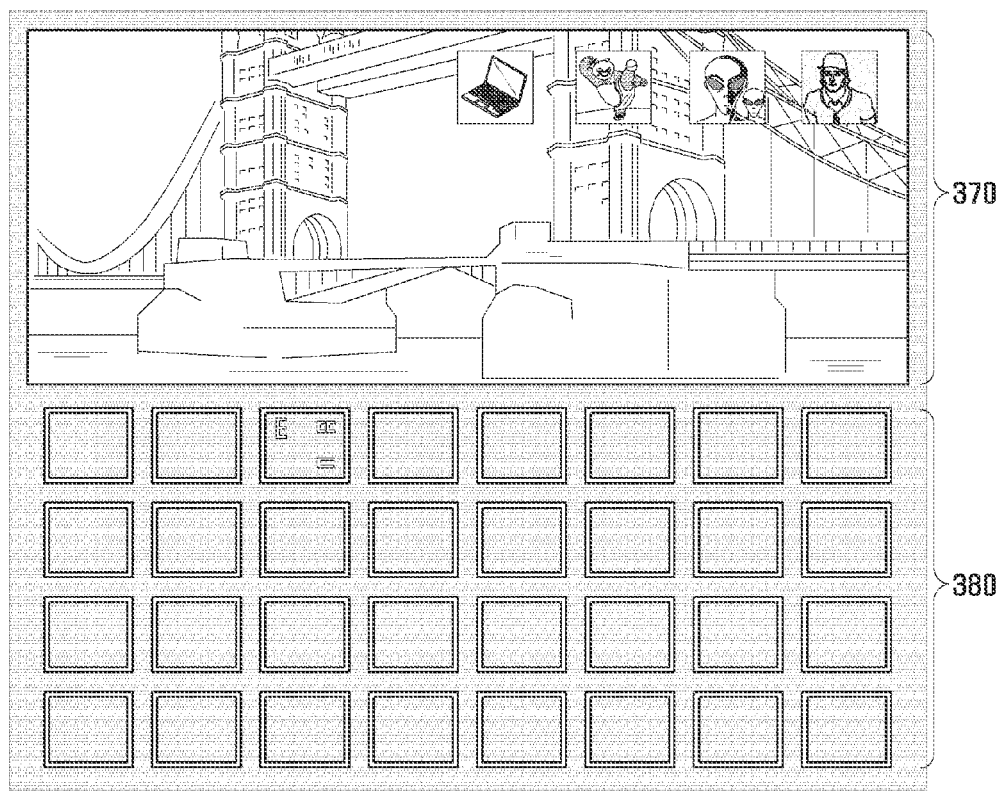
FIGS. 6A to 6C are diagrams illustrating an interface for receiving a user input for arranging icons in a keypad block according to an exemplary embodiment of the present invention.
Figure 6B:
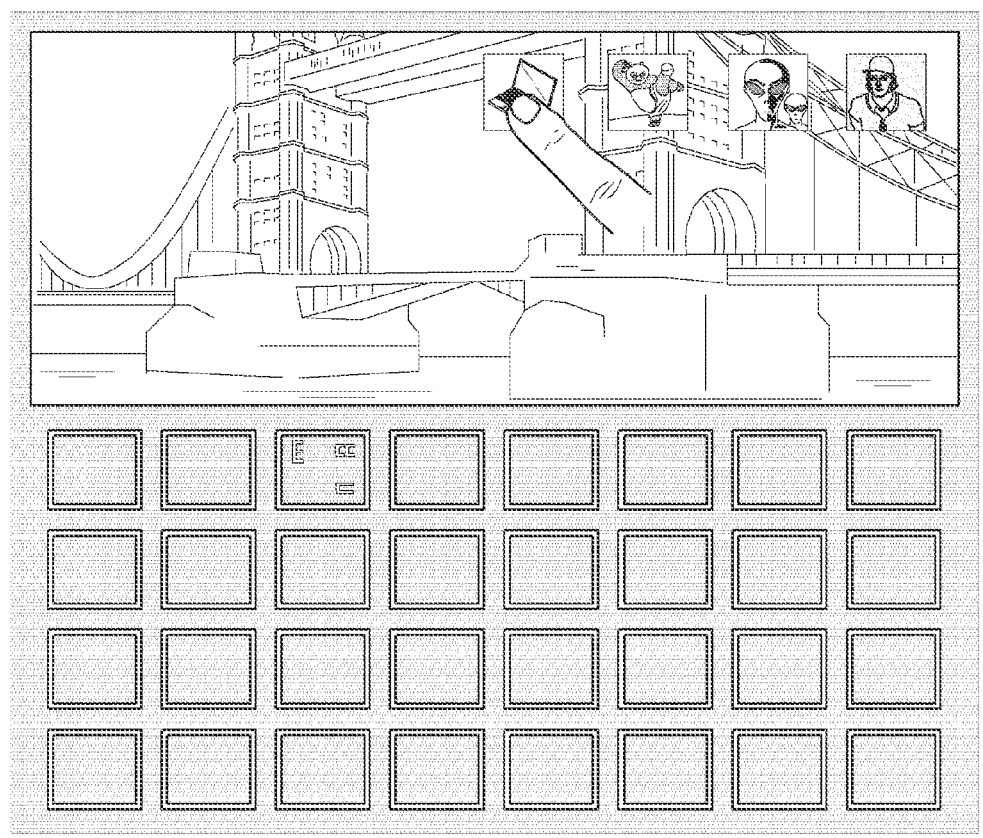
Figure 6C:
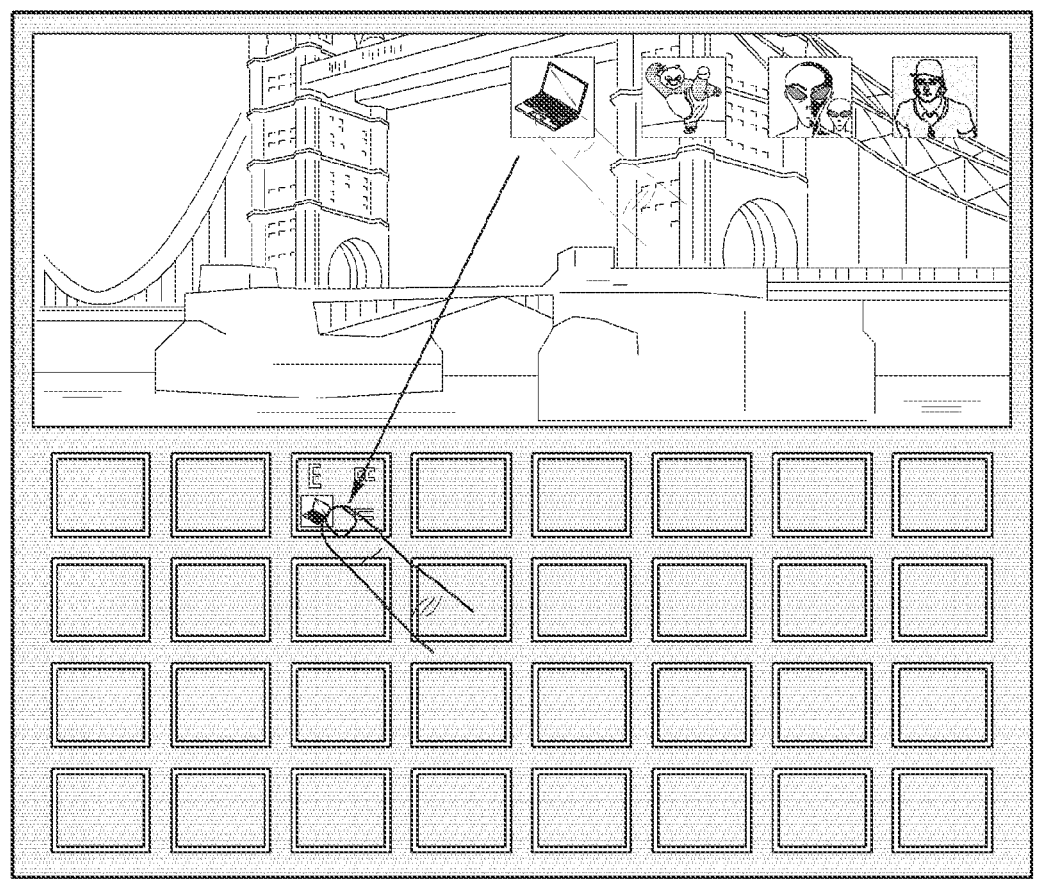

FIGS. 6A to 6C are diagrams illustrating an interface for receiving a user input for arranging icons in a keypad block according to an exemplary embodiment of the present invention.

Referring to FIG. 6A, a first generated icon may be displayed in the second display portion 370.

In this case, the user may want to make a specific keypad block of the first display portion 380 to include a specific icon displayed on the second display portion 370. FIGS. 6B and 6C illustrate an example of the interface receiving such user input.

More specifically, the user performs a touch input on the specific icon of the second display portion 370 as shown in FIG. 6B and a drag input, consecutive to the touch input, into the specific keypad block of the first display portion 380 as shown in FIG. 6C. The control unit 150 which received the user input controls to display the selected icon to the selected keypad block as shown in FIG. 6C.

Returning to FIG. 2, the control unit 150 may determine the light-emitting area among a plurality of areas configuring the keypad block at step 230. Thereafter, the control unit 150 controls an OLED corresponding to the light-emitting area to emit a light to display the keypad block on the screen at step 240.

An example of performing a process for determining a light-emitting area is described below.

Figure 7:
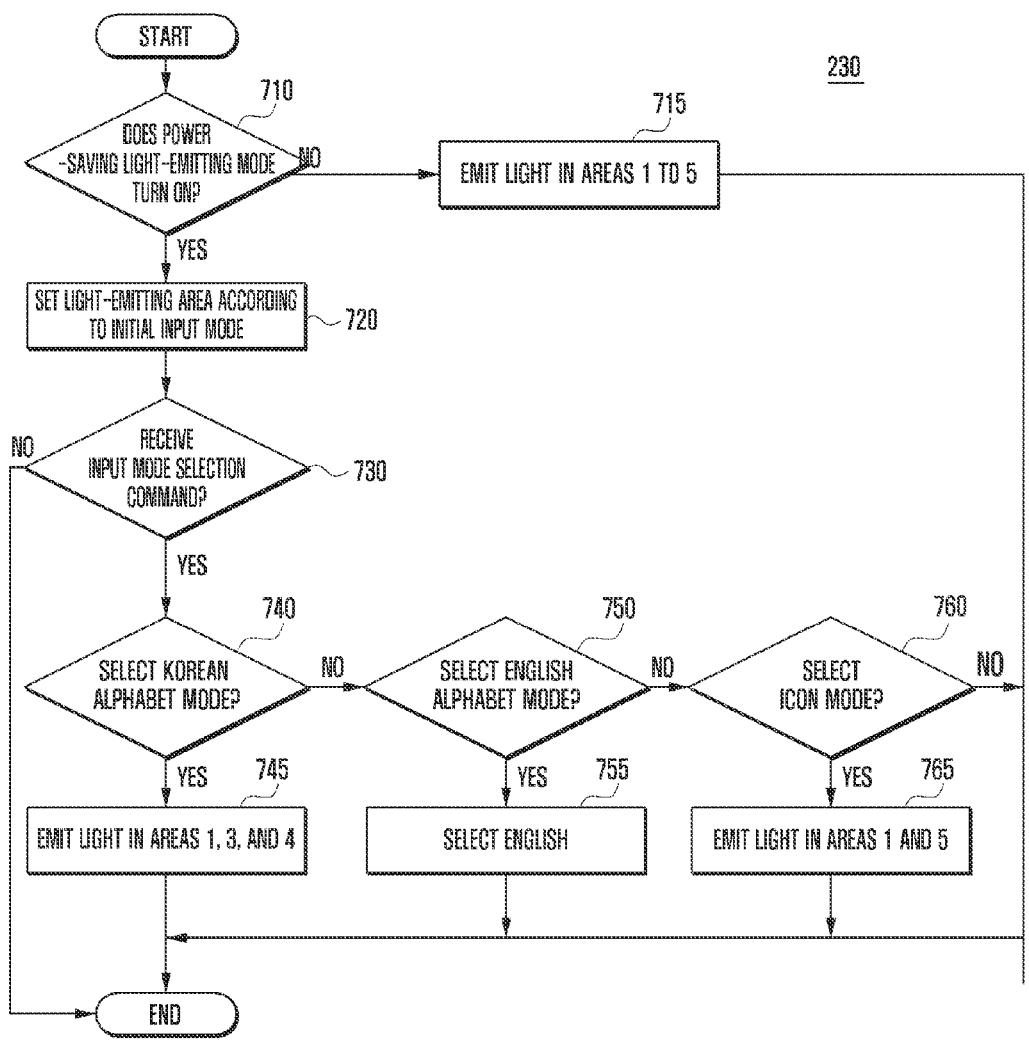
FIG. 7 is a flowchart illustrating a process for determining a light-emitting area according to an exemplary embodiment of the present invention.

FIG. 7 is a flowchart illustrating a process for determining a light-emitting area according to an exemplary embodiment of the present invention.

Referring to FIG. 7, the user may select a power-saving light-emitting mode at step 710. When it is determined that the user turns off the power-saving light-emitting mode at step 710, the control unit 150 controls the entire area configuring the keypad block to emit the light to display the keypad at step 715. In the example of FIG. 7, it is assumed that the keypad includes 5 areas in which light may be emitted. Of course, this is merely an example and there may be more or fewer than 5 areas.

On the other hand, when the user turns on a power-saving light-emitting mode at step 710, the control unit 150 determines the light-emitting area according to a preset initial input mode at step 720. For example, when the initial input mode is set to the Korean alphabet, the control unit 150 determines only the edge area 320 and the Korean alphabet areas 340 and 360 of the keypad block as the light-emitting area.

Thereafter, the control unit 150 may receive the input mode selection command at step 730. When the Korean alphabet mode selection command is received at step 740, the control unit 150 maintains only the edge area 320 and the Korean alphabet areas 340 and 360 of the keypad block as the light-emitting area at step 745.

On the other hand, when the English character mode selection command is received at step 750, the control unit 150 may change the edge area 320 and the English character area 330 of the keypad block as the light-emitting area at step 755. Furthermore, when the icon mode selection command is received at step 760, the control unit 150 may change the edge area 320 and the icon area 350 of the keypad block as the light-emitting area at step 765.

FIGS. 8A to 8D are diagrams illustrating an interface displaying only a light-emitting area according to an exemplary embodiment of the present invention.

Figure 8A:
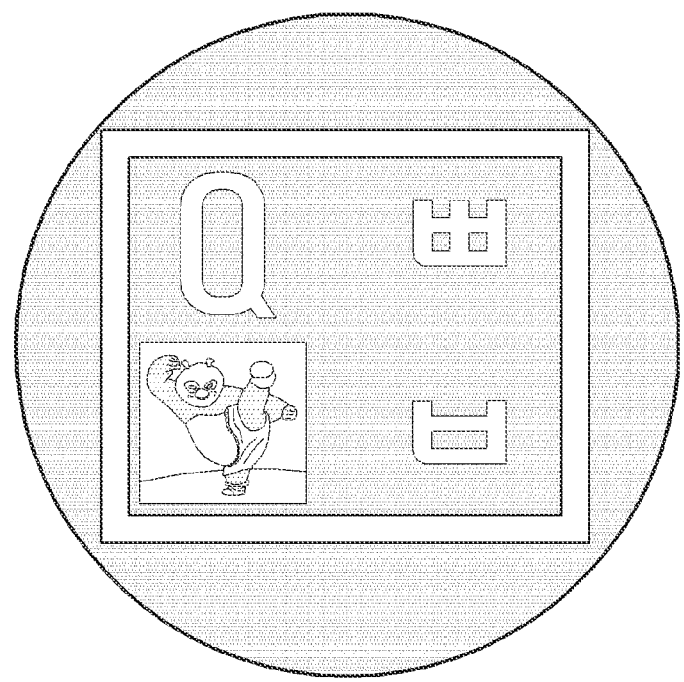
FIGS. 8A to 8D are diagrams illustrating an interface displaying only a light-emitting area according to an exemplary embodiment of the present invention.

Referring to FIG. 8A, the OLEDs corresponding to an entire area configuring the keypad block emit light to display the keypad. According to an exemplary embodiment of the present invention, as shown in FIGS. 8A to 8D, only the OLEDs corresponding to specific areas configuring the keypad block emit light to display the keypad.

Figure 8B:
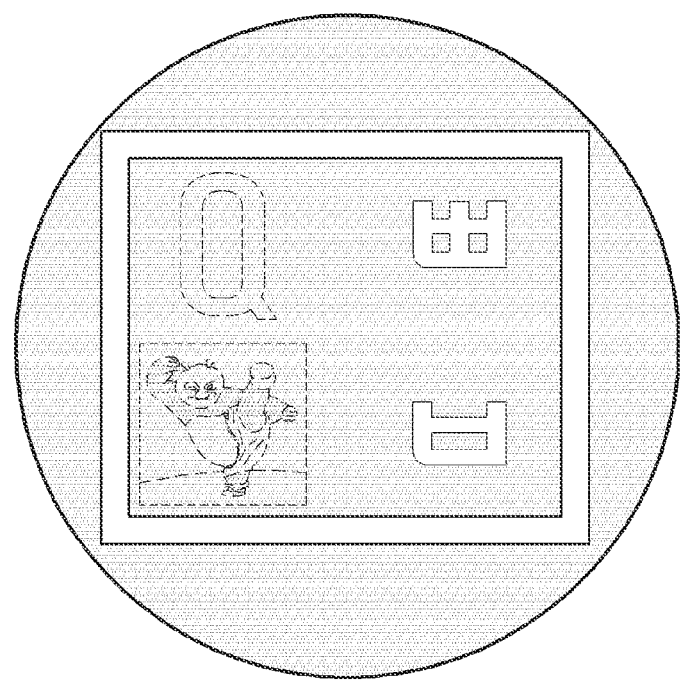
Figure 8C:
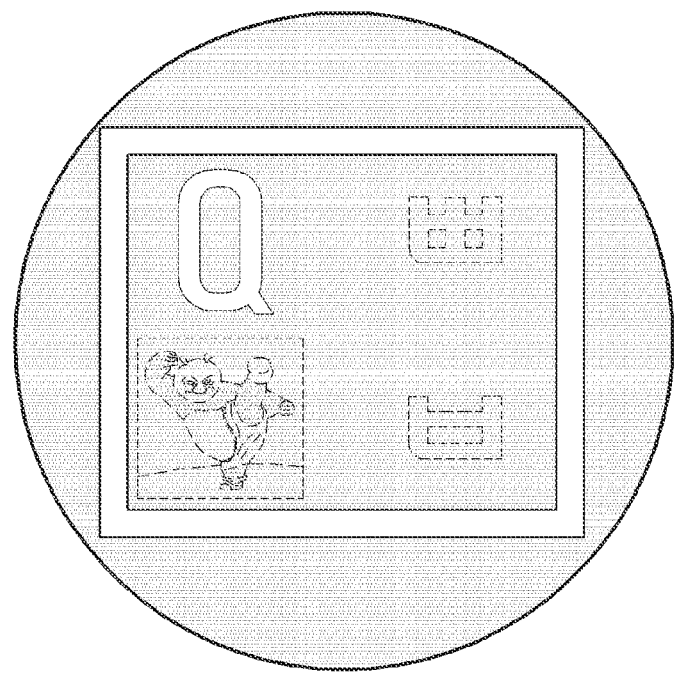

More specifically, as shown in FIG. 8B, when the user selects the Korean alphabet input mode, only the OLEDs corresponding to the edge area and Korean alphabet area emit light to display the Korean alphabet keypad. In addition, as shown in FIG. 8C, when the user selects the English character input mode, only the OLEDs corresponding to the edge area and English character area emit light to display the English character keypad.

Figure 8D:
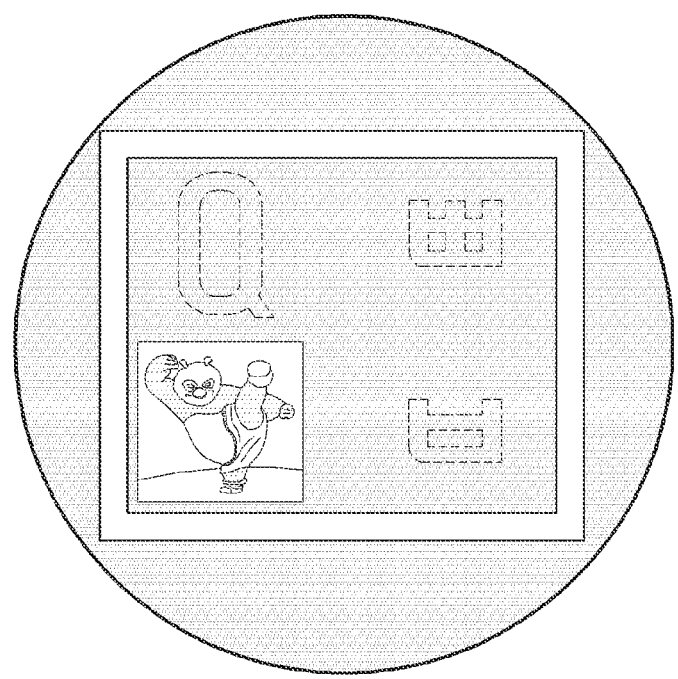

Furthermore, as shown in FIG. 8D, when the user selects the icon input mode, only the OLEDs corresponding to the edge area and the icon area emit light to display the icon keypad.

As set forth above, according to exemplary embodiments of the present invention, the keypad is displayed in such a manner that only an area requiring a user's recognition emits light according to the selection of the input mode, thereby reducing the power consumption according to the keypad display. As set forth above, according to another exemplary embodiment of the present invention, the keypad may be displayed while including the icon, thereby making it possible to effectively configure the keypad display interface.

As set forth above, according to exemplary embodiments of the present invention, the keypad is displayed in such a manner that a light is emitted only in the area that needs to be recognized by the user according to the selection of the input mode, thereby making it possible to reduce the power consumption according to the display of the keypad.

In addition, according to exemplary embodiments of the present invention, since the keypad block may be displayed while including the edge area and at least one of a character area, a number area, and an icon area, the keypad display interface may be effectively configured.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for displaying a keypad on a touch screen including an organic light emitting diode (OLED), the method comprising:
   discriminately displaying a first screen and a second screen, the second screen outputting at least one icon for executing an application;
   arranging, on the first screen, a keypad comprising a plurality of keypad blocks, each of the plurality of keypad blocks including at least two areas;
   determining a light-emitting area among the at least two areas in each keypad block according to an input mode; and
   displaying, on the first screen, the at least one keypad block by selectively emitting light in the OLED corresponding to the determined at least one light-emitting area,
   wherein the arranging of the keypad further comprises disposing the at least one icon into a dedicated icon area of the at least two areas in response to receiving a drag input from the at least one icon to the each keypad block.

2. The method of claim 1, wherein the determining of the light-emitting area comprises:
   receiving a user input selecting an input mode.

3. The method of claim 2,
   wherein the keypad further comprises an edge area, and
   wherein the determining of the light-emitting area comprises determining the at least one of the edge area and a character area or an icon area in each keypad block as the light-emitting area.

4. The method of claim 3, further comprising, before the determining of the light-emitting area, receiving a power-saving release command for setting all of the at least two areas included in each keypad block to the light-emitting area,
   wherein the determining of the light-emitting area comprises determining all of the at least two areas included in each keypad block as the light-emitting area, according to the power-saving release command.

5. The method of claim 4, wherein the arranging of the keypad further comprises arranging the at least one icon in each keypad block according to an icon arrangement rule.

6. The method of claim 5, wherein the icon arrangement rule is a rule for arranging the at least one icon in each keypad block according to a time in which the at least one icon is generated, an execution frequency of the at least one icon, a name of a program corresponding to the at least one icon, or a designation of a user.

7. The method of claim 6, further comprising, before the arranging of the at least one icon, receiving a user input for configuring the plurality of keypad blocks while including the icon area,
   wherein the arranging of the at least one icon comprises arranging the plurality of keypad blocks while including the icon area.

8. An apparatus for displaying a keypad on a touch screen, the apparatus comprising:
   the touch screen including an organic light emitting diode (OLED); and
   a control unit configured to:
      control the touch screen to discriminately display a first screen and a second screen, the second screen outputting at least one icon for executing an application;
      arrange, on the first screen, a keypad comprising a plurality of keypad blocks, each of the plurality of keypad blocks including at least two areas;
      determine a light-emitting area among the at least two areas in each keypad block according to an input mode, and
      display, on the first screen, the at least one keypad block by selectively emitting the light in the OLED corresponding to the determined at least one light-emitting area, wherein the control unit is further configured to dispose the at least one icon into a dedicated icon area of the at least two areas in response to receiving a drag input from the at least one icon to each keypad block.

9. The apparatus of claim 8, wherein the control unit is further configured to:
receive a user input for selecting an input mode.

10. The apparatus of claim 9, wherein the control unit is further configured to:
set the keypad to include an edge area and each of the plurality of keypad blocks to include at least one of a character area or an icon area, and
determine that the at least one of the edge area and the character area or the icon area is set as the light-emitting area.

11. The apparatus of claim 10, wherein the control unit is further configured to:
receive a power-saving release command for setting all of the at least two areas included in each keypad block to the light-emitting area, and
determine all of the areas included in each keypad block as the light-emitting area when receiving the power-saving release command.

12. The apparatus of claim 8, wherein the control unit is further configured to arrange the at least one icon in each keypad block according to an icon arrangement rule.

13. The apparatus of claim 12, wherein the icon arrangement rule is a rule for arranging the at least one icon in each keypad block according to an icon generating time, an icon execution frequency, a name of a program corresponding to the at least one icon, or a designation of a user.

14. The apparatus of claim 13, wherein the control unit is further configured to:
receive a user input for configuring the plurality of keypad blocks including the icon area, and
arrange the plurality of keypad blocks including the icon area when receiving the user input.

* * * * *